United States Patent [19]
Kruchowy

[11] Patent Number: 5,309,647
[45] Date of Patent: May 10, 1994

[54] FIBER OPTIC CABLE FOOTAGE INDICATOR

[75] Inventor: Roman Kruchowy, Somis, Calif.

[73] Assignee: The United States of America as represented by the Secretary of the Navy, Washington, D.C.

[21] Appl. No.: 992,323

[22] Filed: Dec. 21, 1992

[51] Int. Cl.$^5$ ............................................. B65H 61/00
[52] U.S. Cl. ........................................ 33/733; 33/716; 33/732; 33/750
[58] Field of Search ................. 33/700, 713, 714, 715, 33/716, 719, 732, 733, 750, 751; 254/134.35 C

[56] References Cited

U.S. PATENT DOCUMENTS

| | | | |
|---|---|---|---|
| 1,286,156 | 11/1918 | Vallaro | 33/716 |
| 1,625,976 | 4/1927 | Bechtel | 33/716 |
| 2,729,100 | 1/1956 | McCool et al. | 33/715 |
| 2,934,695 | 4/1960 | Maulsby | 33/732 |
| 3,713,224 | 1/1973 | Bengua | 33/715 |
| 4,400,882 | 8/1983 | Thornton | 33/732 |

Primary Examiner—Thomas B. Will
Attorney, Agent, or Firm—David S. Kalmbaugh; Melvin J. Sliwka; John L. Forrest, Jr.

[57] ABSTRACT

An apparatus for measuring the length of fiber optic cable being deployed from a winch to an underwater environment. The cable deployment measuring apparatus of the present invention comprises a constant current generator for generating a direct current, a resistor array having a plurality of series connected resistors and a plurality of trip wires with one of the trip wires being connected across each of the resistors. The trip wires which function as short circuits are also attached to the cable at predetermined locations along the length of the cable. When the fiber optic cable is being deployed, each trip wire will break when the location at which the trip wire is positioned is unwound from the winch for deployment in the underwater environment. This, in turn, will cause flow through the resistor array with a resulting voltage drop across the array. A digital volt meter may, for example, be used to measure the voltage drop across the array with the voltage reading provided by the volt meter being indicative of the length of fiber optic cable already deployed.

9 Claims, 2 Drawing Sheets

FIBER OPTIC CABLE FOOTAGE INDICATOR

BACKGROUND OF THE INVENTION

1. Field of the Invention

The present invention relates generally to measuring apparatus. In particular, the present invention relates to an apparatus for measuring the length of fiber optic being deployed in an underwater environment or the like.

2. Description of the Prior Art

The military annually deploys several thousand miles of fiber optic cable underwater for use with communications systems. The underwater surface upon which the fiber optic cable is deployed is often not flat and may include craters, canyons, and even a vast chasm within which the fiber optic cable must be deployed.

When fiber optic cable is deployed in an underwater environment, there is a requirement that the cable follow the contour of the ocean floor, otherwise there may be excessive strain on the cable due to ocean currents when, for example, the cable is deployed within an underwater canyon. This excessive strain may eventually cause breakage of the fiber optic cable disrupting critical military communications systems. In addition, when excessive fiber optic cable is deployed over a given length of the ocean floor, twists and kinks may result in the cable being deployed.

There is available apparatus which will provide accurate contour measurements of the ocean floor. Using conventional and well known digital processors the length of fiber optic cable required for deployment to traverse a given distance across the ocean floor may then be calculated. However, when deploying cable from a cable reel, apparatus which are used to measure the length of the cable being deployed, such as pinch rollers, often provide inaccurate cable length measurements due to, for example, slippage of the cable passing through the pinch rollers and variations in the diameter of the fiber optic cable being deployed. This, for example, may result in a fiber optic cable being deployed under tension across a canyon which, in turn, may lead to breakage of the cable.

As is best illustrated by FIG. 1, prior art apparatus for monitoring the length of fiber optic cable being deployed comprised a pair of pinch rollers, a shaft encoder having one of the pinch rollers mechanically coupled thereto and a digital signal processor electrically connected to the shaft encoder. As the cable is being deployed the pinch rollers will rotate in the directions indicated and the shaft encoder being responsive to the rotation of the upper pinch roller will provide a pulse train with each pulse indicating that one inch of fiber optic cable has been deployed. The digital signal processor then receives the pulse train and in response to the pulse train calculates the length of fiber optic cable that has been deployed. This prior art cable deployment measuring apparatus also includes trip wires positioned at precise locations along the length of the cable with the first trip wire being positioned at, for example, one thousand forty seven feet and the second trip wire being positioned at two thousand thirty eight feet.

The trip wires, in turn, interface with the digital signal processor and provide an accurate reading of cable deployment by resetting an internal counter within the digital signal processor to the exact locations of the trip wires. Thus, when one thousand forty seven feet of fiber optic cable has been deployed the first trip wire attached to the cable will reset the counter within the digital signal processor to a value of one thousand forty seven.

This prior art cable deployment monitoring system in addition to providing inaccurate cable length measurements is a complex and expensive monitoring system which uses multichannel digital input/output interface circuits to connect the monitoring means, that is the encoder and the trip wires to the digital signal processor.

With the above and other disadvantages known to prior art cable length measuring apparatus the present invention was conceived and one of its objects is to provide a cable length measuring apparatus which will measure the length of fiber optic cable as the cable is being deployed in an underwater environment.

It is another object of the present invention to provide a relatively simple and inexpensive yet very accurate cable length measuring apparatus.

Various other objects and advantages of the present invention will become apparent to those skilled in the art as a more detailed description of the invention is set forth below.

SUMMARY OF THE INVENTION

The present invention overcomes some of the disadvantages of the prior art, including those mentioned above in that it comprises an efficient, yet relatively simple apparatus for accurately measuring the length of fiber optic cable being deployed from a winch to an underwater environment. Included in the present invention is a constant current generator for generating a direct current, a resistor array having a plurality of series connected resistors and a plurality of trip wires with one of the trip wires being connected across each of the resistors. The trip wires which function as short circuits are also attached to the cable at predetermined locations along the length of the fiber optic cable.

When the fiber optic cable is being deployed, each trip wire will break when the location at which the trip wire is positioned is unwound from the winch for deployment in the underwater environment. This, in turn, will cause flow through the resistor array with a resulting voltage drop across the array. A digital volt meter may, for example, be used to measure the voltage drop across the array with the voltage reading provided by the volt meter being indicative of the length of fiber optic cable already deployed. As an alternative a digital signal processor may used to process the voltage drops occurring across the resistors array and thereby determine the length of cable that has been deployed.

DETAILED DESCRIPTION OF THE PREFERRED EMBODIMENT

Figure 1:
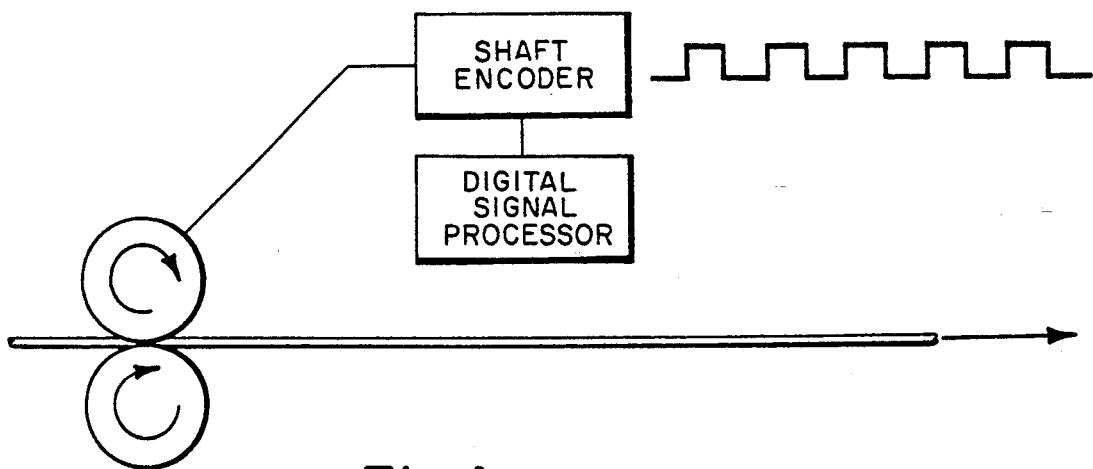
FIG. 1 is schematic diagram illustrating the prior art apparatus for monitoring the length of cable be deployed in an underwater environment.
Figure 2:
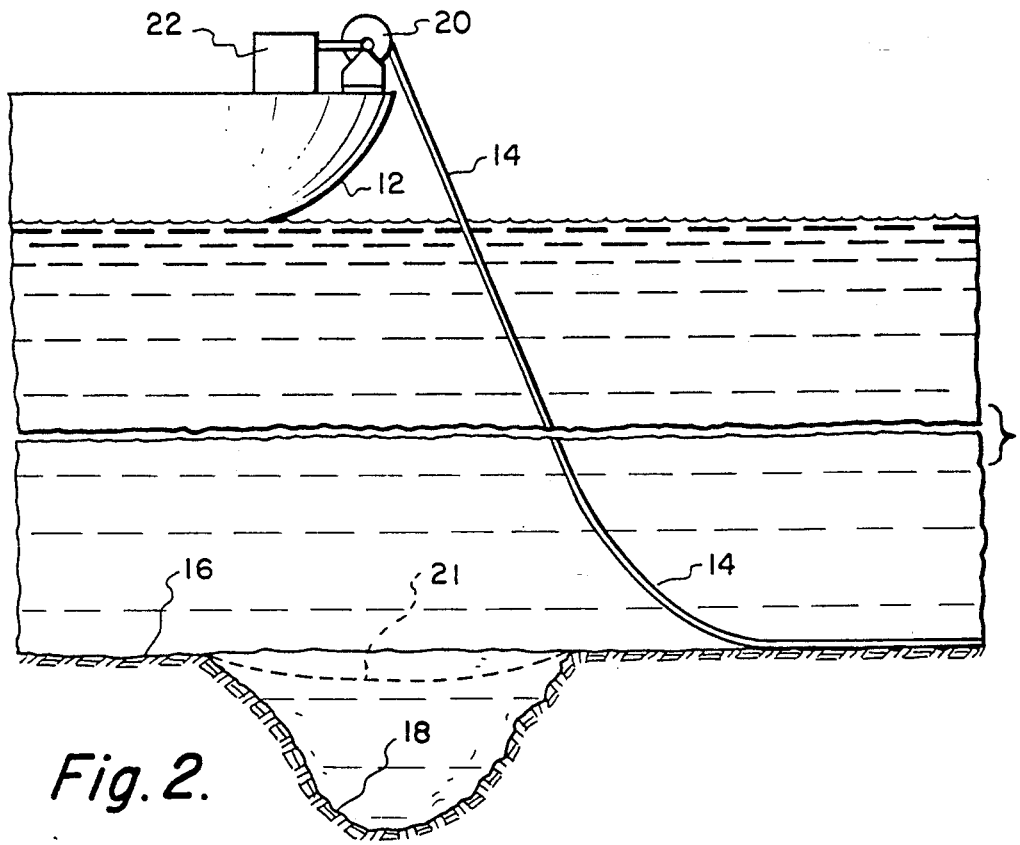
FIG. 2 is a side view illustrating a shipboard deployment system with which the cable footage indicator of the present invention may be utilized.

Referring to FIG. 2, there is shown an ocean going vessel 12, which is being utilized to deploy a fiber optic communications cable 14 on the ocean floor 16. Ocean floor 16 may have canyons 18 into which fiber optic communications cable 16 must be deployed, otherwise there may be excessive stress placed upon cable 14 if cable 14 is deployed across canyon 18 in the manner illustrated by dashed line 21. This, in turn, may result in breakage of fiber optic communications cable 14 due to oceans current and the like.

Ship 12 has mounted at its stern a winch 20 upon which fiber optic communications cable 14 is wound. Winch 20 may be driven by a variable speed motor 22 which allows cable 14 to be unwound from winch 20 at a rate which varies with the contour of ocean floor 16. Thus, when vessel 12 travels at a fixed speed across canyon 18 the speed at which the motor 22 unwinds cable 14 from winch 20 is increased allowing cabled to be deployed at a rate which allows cable 14 to follow the contour of ocean floor 16.

Figure 4:
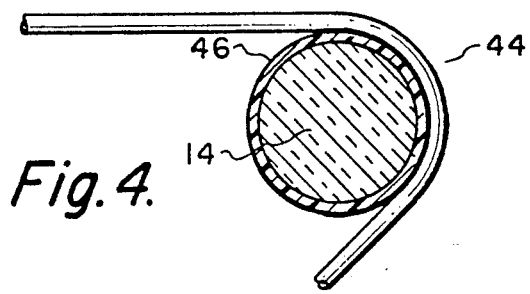
FIG. 4 is a view in section illustrating a trip wire partially wrapped around the fiber optic cable being deployed.
Figure 3:
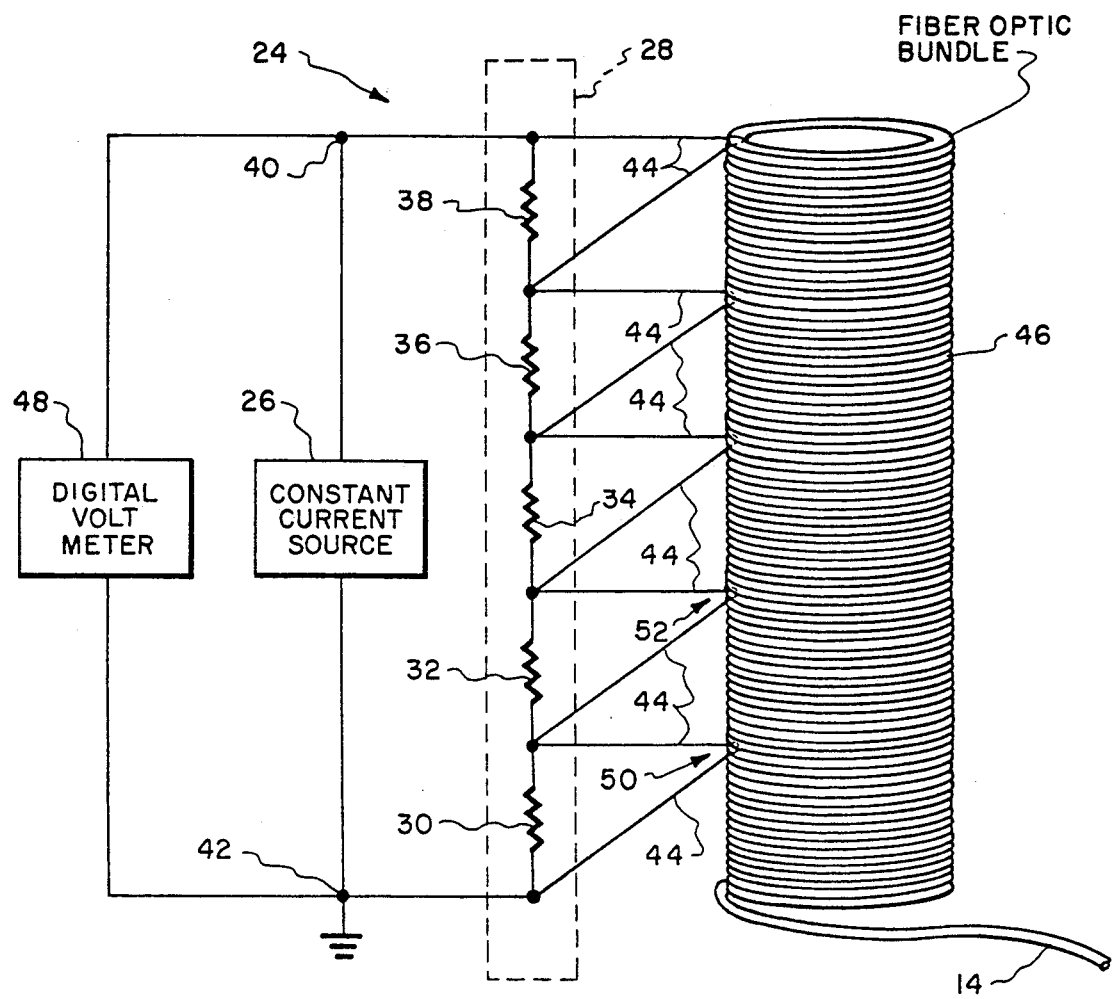
FIG. 3 is an electrical schematic diagram of the cable footage indicator constituting the present invention.

Referring to FIGS. 2, 3 and 4, there is shown a fiber optic cable footage indicator 24 which is used to accurately determine the length of fiber optic communications cable 14 being deployed by vessel 12. Fiber optic cable indicator 24 comprises a constant current generator/source 26 a direct current of approximately ten milliamps and a shunt resistor array 28 having a plurality of ten ohm resistors 30, 32, 34, 36 and 38 which are connected in series between output terminal 40 and ground terminal 42 of current generator 26. As is best illustrated by FIG. 4, there is partially wrapped around the outer surface of fiber optic communications cable 14 a plurality of trip wires 44 with each trip wire 44 being bonded to cable 14 with an adhesive 46 such as a commercially available glue or epoxy. Trip wires 44 are positioned at precise locations along the length of the cable. Trip wires 44 may be positioned at intervals of one thousand feet or intervals of five hundred feet.

After fiber optic communications cable 14 is wound around winch 20 in a bundle 46 for deployment on the ocean floor, each trip wire 44 is electrically connected to one of the resistors 30, 32, 34, 36 or 38 of resistor array 28. There is also electrically connected between output terminal 40 of generator 26 and ground terminal 42 of generator 26 a digital volt meter 48 for reading the voltage drop across resistor array 28.

In operation, constant current generator 26 provides a direct current of approximately ten milliamps. Prior to deployment of cable 14 trip wires 44 will effectively function as a short circuit allowing current to flow from generator 26 through resistor array 28 which results in a reading of zero volts by digital volt meter 48. After winch 20 has unwound one thousand feet of cable 14 from bundle 46, the trip wire 44 electrically connected across resistor 30 will break at connecting point 50 resulting in current flow through resistor 30. Digital volt meter 48 will then provide a reading of one tenth of one volt indicating the winch 20 has unwound one thousand feet of fiber optic communications cable 14 for deployment on the ocean floor 16. In a like manner, when winch 20 unwinds two thousand feet of cable 14 the trip wire 44 electrically connected across resistor 32 will break at connecting point 52 resulting in current flow through resistors 30 and 3 and digital volt meter 48 providing a reading of two tenths of a volt. The above process will continue until each trip wire 44 breaks resulting in current flow through each of the resistors 30–38 of array 28 and a voltage reading of five tenths of one volt. This, in turn, indicates that five thousand feet of cable 14 has been unwound for deployment on ocean floor 16.

It should be noted that if it is required to deploy, for example, ten thousand feet of fiber optic communications cable 14 then a resistor array comprising ten resistors would be utilized, while the requirement to deploy twenty thousand feet of fiber optic communications cable 14 would require the use of a resistor array of twenty resistors. In addition, it should be noted that if it is desired, for example to measure cable length every five hundred feet than trip wires would be spaced apart every five hundred feet along cable 14.

Figure 5:
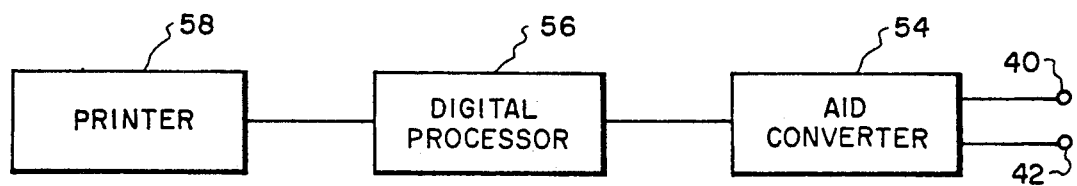
FIG. 5 is a partial electrical schematic of an alternate embodiment of the present invention.

Referring to FIG. 5, there is shown an alternative embodiment of the fiber optic cable footage indicator 24 wherein a digital to analog converter 54 is electrically connected between output terminal 40 and ground terminal 42. The voltage measured across resistor array 28 during deployment of fiber optic communications cable 14 is converted from an analog signal to digital logic signals by converter 54 for processing by digital processor 56. Digital processor 56, in turn, may be used to calculate the length of cable being deployed and printer 58 may be used to provide a visual readout of the length of fiber optic cable that has been deployed.

From the foregoing, it may readily be seen that the present invention comprises a new unique and exceedingly useful fiber optic cable footage indicator for fiber optic cable being deployed in an underwater environment which constitutes a considerable improvement over the known prior art. Obviously many modifications and variations of the present invention are possible in light of the above teachings. It is, therefore to be understood that within the scope of the appended claims that the invention may be practiced otherwise than as specifically described.

What is claimed is:

1. An apparatus for measuring the length of fiber optic cable being unwound from a winch for deployment in an underwater environment, said apparatus comprising:

a constant current source for generating a direct current, said constant current source having an output terminal and a ground terminal;

a resistor array having a plurality of resistors, the resistors of said resistor array being connected in series, said resistor array having an input connected to the output terminal of said current source and output connected to the ground terminal of said current source;

a plurality of trip wires attached to said fiber optic cable, each of said trip wires being positioned at a precisely known location on said cable;

each of said trip wires being electrically connected across one of said resistors of said resistor array thereby allowing current to flow through said trip wire, said trip wire being electrically disconnected from said resistor when the location on said fiber optic cable at which said trip wire is attached is unwound from said winch for deployment thereby allowing current to flow through said resistor; and means for measuring the current flow through said resistors of said resistor array and in response to said measurement providing a visual readout indicating the length of fiber optic cable that has been deployed.

2. The apparatus of claim 1 wherein said measuring and visual readout means comprises a volt meter.

3. The apparatus of claim 2 wherein said volt meter comprises a digital volt meter.

4. The apparatus of claim 1 wherein said measuring and visual readout means comprises:
   a digital to analog converter connected between the input and output terminals of said constant current source, said digital to analog converter having a digital signal output;
   a digital signal processor having an input connected to the digital signal output of said digital signal processor and an output; and
   a printer having input connected to the output of said digital signal processor.

5. The apparatus of claim 1 wherein one of said plurality of trip wires are positioned along the length of said fiber optic cable every one thousand feet.

6. The apparatus of claim 1 wherein one of said plurality of trip wires are positioned along the length of said fiber optic cable every five hundred feet.

7. The apparatus of claim 1 wherein said trip wires are attached to said cable by an adhesive, said adhesive comprising a glue.

8. The apparatus of claim 1 wherein each of said resistors is a ten ohm resistor.

9. The apparatus of claim 1 wherein said constant current source generates a direct current of ten milliamps.

* * * * *